(12) United States Patent
Von Glabeke

(10) Patent No.: US 7,342,394 B2
(45) Date of Patent: Mar. 11, 2008

(54) MAGNETIC DETECTOR ARRANGEMENT AND METHOD FOR OBTAINING A SYMMETRIC MAGNETIC FIELD

(75) Inventor: Pierre Von Glabeke, Eeklo (BE)

(73) Assignee: Volvo Lastvagues AB, Gothenburg (SE)

( * ) Notice: Subject to any disclaimer, the term of this patent is extended or adjusted under 35 U.S.C. 154(b) by 0 days.

(21) Appl. No.: 11/551,706

(22) Filed: Oct. 21, 2006

(65) Prior Publication Data
US 2007/0040550 A1    Feb. 22, 2007

Related U.S. Application Data

(63) Continuation of application No. PCT/SE2005/000745, filed on May 19, 2005.

(30) Foreign Application Priority Data
May 19, 2004    (SE) .................................... 0401310

(51) Int. Cl.
*G01B 7/14*    (2006.01)
(52) U.S. Cl. ............................ 324/207.15; 324/207.24; 324/207.26
(58) Field of Classification Search ................. 324/207, 324/207.2–207.26
See application file for complete search history.

(56) References Cited

U.S. PATENT DOCUMENTS

| | | | |
|---|---|---|---|
| 3,680,026 A | * | 7/1972 | Masuda et al. ............ 338/32 H |
| 5,606,254 A | | 2/1997 | Xie et al. |
| 5,781,005 A | * | 7/1998 | Vig et al. ................. 324/207.2 |
| 6,064,198 A | * | 5/2000 | Wolf et al. ............... 324/207.2 |
| 6,703,830 B2 | * | 3/2004 | Kaste ..................... 324/207.26 |
| 6,737,862 B1 | * | 5/2004 | Godoy et al. ........... 324/207.21 |
| 2004/0017187 A1 | * | 1/2004 | Van Ostrand et al. .. 324/207.21 |

FOREIGN PATENT DOCUMENTS

| | | |
|---|---|---|
| DE | 3510503 A1 | 10/1986 |
| DE | 3638622 A1 * | 5/1988 |
| DE | 20315448 U1 | 12/2003 |

OTHER PUBLICATIONS

International Search Report for corresponding PCT/SE2005/000745.

* cited by examiner

*Primary Examiner*—Jay M Patidar
(74) *Attorney, Agent, or Firm*—WRB-IP LLP

(57) ABSTRACT

A magnetic detector arrangement includes two equally polarized magnets positioned next to each other with the polarization in the same direction, and a magnetic detector element, wherein the magnets are arranged at a predefined distance apart such that the magnetic field from the magnets will superimpose. A magnetic detector arrangement with an improved tolerance towards deviations in the magnetic field of the comprised permanent magnets can be provided.

11 Claims, 5 Drawing Sheets

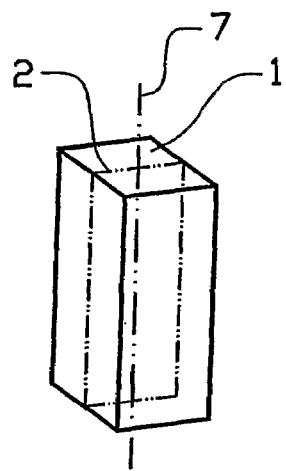
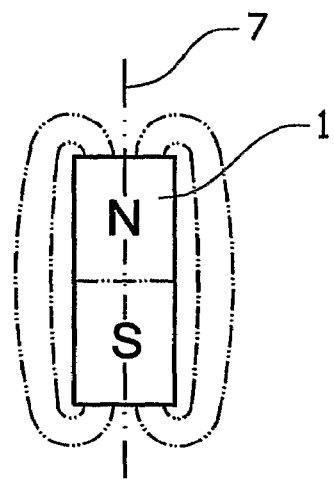
FIG. 1a          FIG. 1b
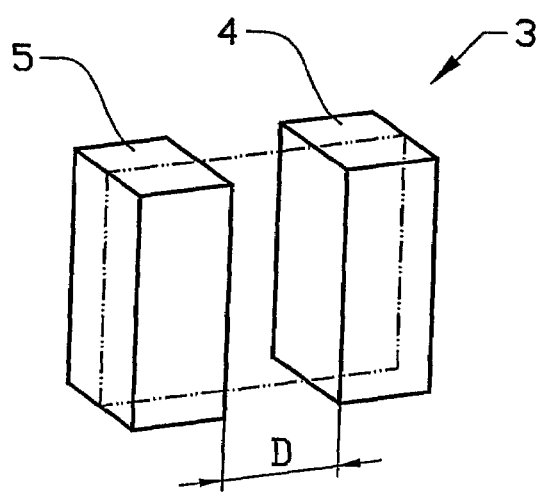
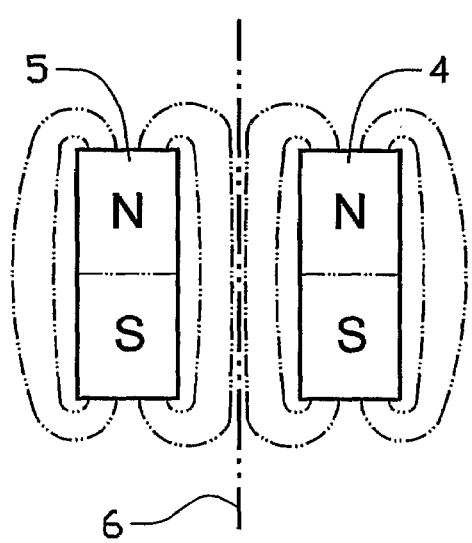
FIG. 2a          FIG. 2b

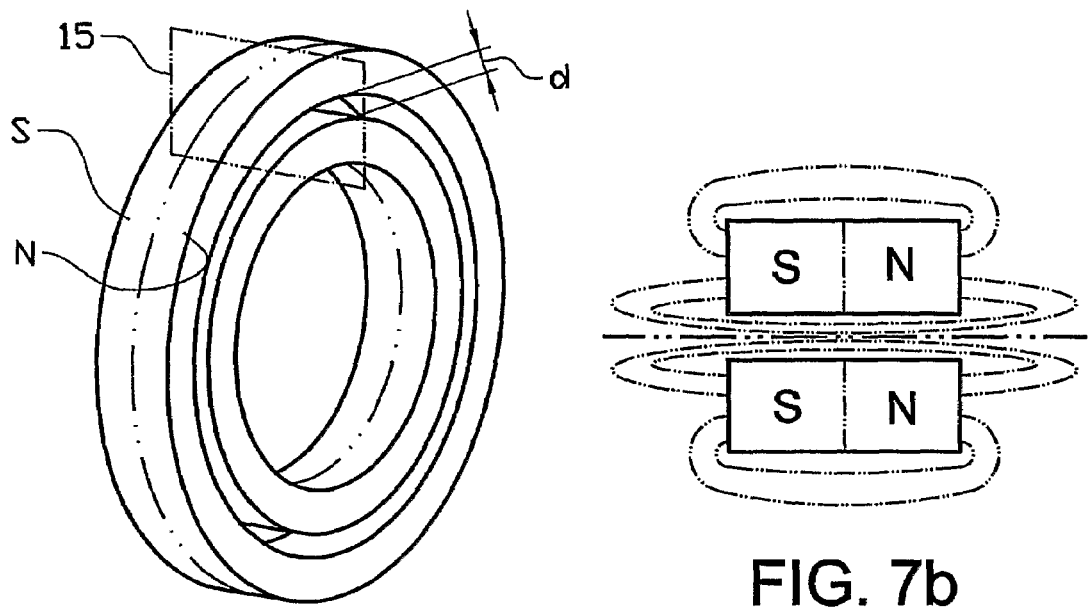
FIG. 7a
FIG. 7b
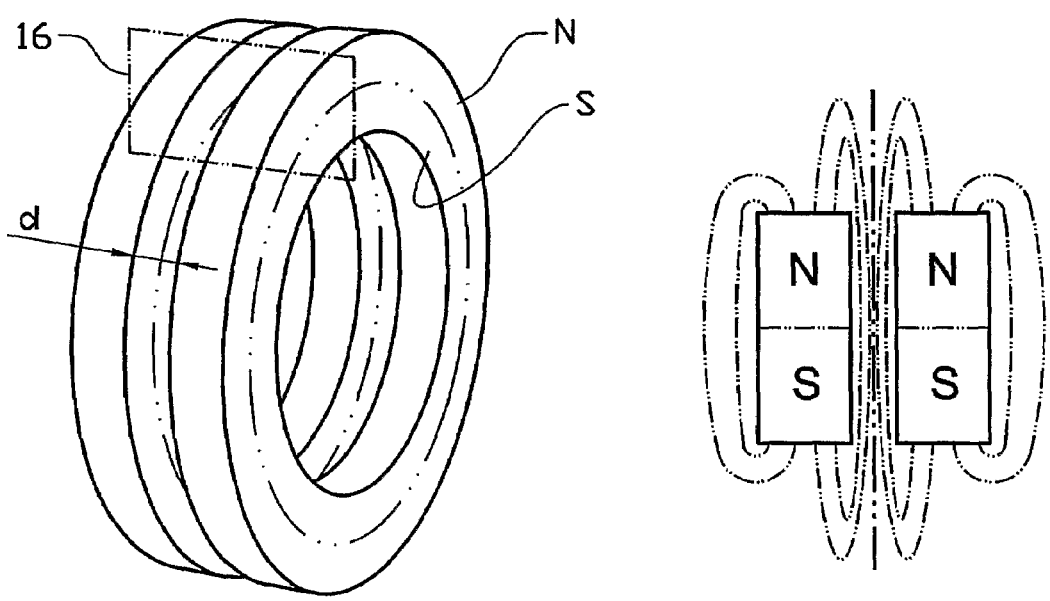
FIG. 8a
FIG. 8b

MAGNETIC DETECTOR ARRANGEMENT AND METHOD FOR OBTAINING A SYMMETRIC MAGNETIC FIELD

The present application is a continuation of International Application No. PCT/SE2005/000745, filed May 19, 2005, which claims priority to SE 0401310-8 filed May 19, 2004, both of which are incorporated by reference.

BACKGROUND AND SUMMARY

The present invention relates to a magnetic detector arrangement and a method for obtaining a symmetric magnetic field, suitable for a magnetic detector arrangement. This magnetic detector arrangement allows for improved magnetic switches and sensors.

In modern vehicles, there are many functions that are controlled electronically. Some of these functions are of the on/off type, some can be switched to several positions and some are analogue. Directly coupled switches and sensors control most functions, but some functions require a contact-less operation. An example of functions where a contact-less operation is preferred is e.g. ABS-sensors (ABS=Automatic Brake System), chassis height detection or switches that are exposed to weather, pollutions and direct friction. One kind of contact-less switches and sensors are based on a magnetic principle. There exist different types of magnetic detectors, e.g. reed-contacts, hall-sensors and other kinds of integrated magnetic detectors. A magnetic field is used to influence the detector. The detector and the magnet thus form the switch or the sensor.

To obtain a switch or a sensor with a high resolution and which at the same time is insensitive to external magnetic fields, it is desirable to position the magnet and the detector close to each other. In this way, it is possible to use a detector with a low sensitivity, obtaining a switch or a sensor that is insensible to external magnetic fields.

One problem with magnetic switches and sensors is that the sensitivity of the detector must increase with an increased detection distance. For some applications, especially for magnetic switches, it may be possible to overcome the increased distance with a larger or stronger magnet with a stronger magnetic field.

A problem with the detector being very sensitive is that it will more easily be disturbed by an external, interfering magnetic field. This can e.g. occur when the sensor is close to a high current cable or a large transformer. Thus, it is preferred not to raise the sensitivity too much for the detector.

A problem that arises when the magnetic field is increased by using a larger magnet is that the magnetic field is not only stronger, it is also more distributed in space. This gives the effect that, when an analogue detector is used, the resolution will be degraded due to the imprecise magnetic field.

Due to the nature and to the production process of permanent magnets, the magnetic properties for magnets can vary considerably, even if they are manufactured in the same batch and at the same time. Properties that vary are e.g. the magnetic remanence and the direction of the magnetic field. These varying properties in turn can cause magnetic switches and sensors to behave different even if the specifications are equal. In production, this can cause considerably problems with adjustments and rejected parts.

It is desirable to achieve an improved magnetic detector arrangement that is less sensitive to variations in the magnetic properties of permanent magnets and a method for obtaining a symmetric magnetic field.

According to an aspect of the present invention, a magnetic detector arrangement, comprises two equally polarised magnets positioned next to each other with polarisation of each magnet in the same direction, and a magnetic detector element, wherein the magnets are arranged at a predefined distance apart such that magnetic fields from the magnets will superimpose.

According to another aspect of the present invention, a method for obtaining a symmetric magnetic field in a magnetic detector arrangement from a magnetic arrangement comprising two magnets comprises, if each magnet displays a deviation of a direction of the magnetic field in respect to a symmetry axis, positioning the magnets such that the deviation is symmetric in respect to a central line between the magnets.

With a magnetic detector arrangement, comprising two equally polarised magnets positioned next to each other with the polarisation in the same direction, and a magnetic detector element, a useful measure of an aspect of the invention is achieved by the magnets being arranged at a predefined distance apart such that the magnetic field from the magnets will superimpose.

A method for obtaining a symmetric magnetic field in a magnetic detector arrangement from a magnetic arrangement comprising two magnets, solves the problem by, if each magnet displays a deviation of the direction of the magnetic field in respect to the symmetry axis, then to position the magnets such that the deviation is symmetric in respect to a central line between the magnets.

By this first embodiment of the magnetic detector arrangement according to the invention, a magnetic detector is obtained where a magnetic field, that is as wide as possible and approximately equal in respect to a central line between the magnets, is created by a plurality of magnets. By using more than one magnet and by arranging the magnets at a predefined distance apart, it is possible to widen the magnetic field and at the same time to keep the magnetic field strength approximately equal over the width. Compared with a single magnet, the magnetic field is widened and flattened out. Thus, the performance of the detector is improved and the tolerance for deviations in the magnetic properties of the permanent magnets is enhanced. This allows for magnetic sensors that have an improved resolution and/or an improved resistance to external magnetic fields.

In an advantageous further development of the arrangement according to the invention, the magnets are arranged such that the magnetic field is symmetric in respect to a central line between the magnets. The advantage of this is the performance of the detector is improved further.

In an advantageous further development of the arrangement according to the invention, the space between the magnets and/or the sides opposite the space between the magnets is/are supplied with a ferro—magnetic material. This makes it possible to adapt the magnetic detector to the desired requirements by controlling the magnetic field.

By the first embodiment of the method for obtaining a symmetric magnetic field from a magnetic arrangement comprising two magnets, the magnets are positioned so that the deviation from one magnet compensates the deviation of the other magnet. Thus, an improved magnetic field is obtained. In an advantageous further development of the method according to the invention, a single magnet is divided into the two magnets. The advantage of this is that the magnetic properties of the two resulting magnets will be the same. This makes it possible to obtain a symmetric magnetic field from two magnets without the need to measure each magnet.

In an advantageous further development of the method according to the invention, the distance between the magnets is the critical distance d. This allows for a wide magnetic field with an equal magnetic density.

In an advantageous further development of the method according to the invention, the distance between the magnets is close to or equal to zero. The advantage of this is to provide a magnetic arrangement that resembles a single magnet and where the direction of the magnetic field is parallel to the symmetry axis.

BRIEF DESCRIPTION OF DRAWINGS

The invention will be described in greater detail in the following, with reference to the embodiments that are shown in the attached drawings, in which FIG. 1a shows a known magnet, FIG. 1b shows a cut section of a known magnet with magnetic field lines, FIG. 2a shows a magnetic arrangement included in the invention, FIG. 2b shows a cut section of the magnetic arrangement according to 2a with magnetic field lines, FIG. 7a shows an embodiment of the magnetic arrangement included in the invention, FIG. 7b shows a cut section of the embodiment according to 7a with magnetic field lines, FIG. 8a shows an embodiment of the magnetic arrangement included in the invention, FIG. 8b shows a cut section of the embodiment according to 8a with magnetic field lines.

DETAILED DESCRIPTION

Figure 3A:
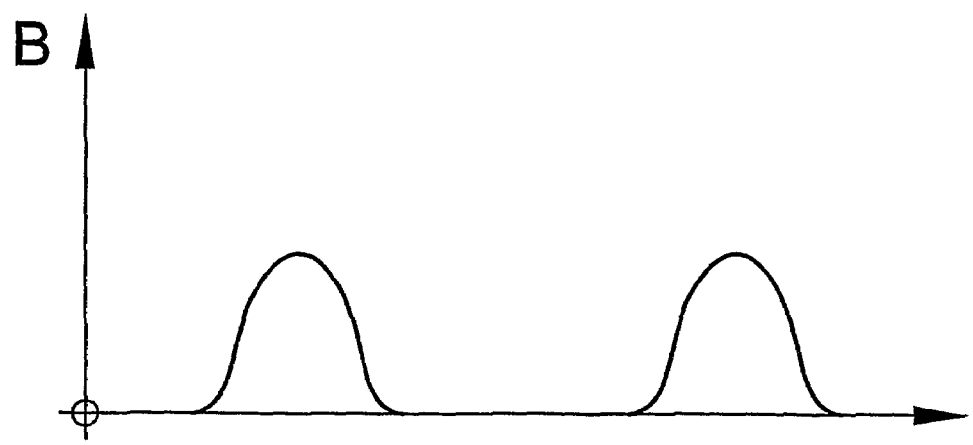
FIG. 3a-3c shows a schematic relationship between the magnetic flux density B for a magnet and the distance D.

The embodiments of the invention with further developments described in the following are to be regarded only as examples and are in no way to limit the scope of the protection provided by the patent claims.

FIG. 1a shows a known permanent magnet 1. FIG. 1b shows a cut section of the magnet 1 along a plane 2 through the middle of the magnet with some schematic magnetic lines indicated with dash dotted lines. The shown magnet is rectangular and symmetrically polarised with a north pole, denoted with an N, and a south pole, denoted with an S. The magnet can be made from any suitable material.

Below, when a magnetic arrangement is described and shown as a cut section, it is a similar cut through the middle of the magnetic arrangement that is used to illustrate the magnetic arrangement with schematic magnetic lines, also indicated with dash dotted lines. It is also assumed that the magnetic field is symmetrical along its symmetry axis 7, a centre line running from N to S in the middle of the magnet.

In FIG. 2a, a magnetic arrangement 3 comprising two permanent magnets 4, 5 is shown. Preferably, the magnets have approximately the same magnetic properties. It is advantageous if the magnets are made out of the same material and have the same geometric outline, but some deviations are acceptable. As the skilled person will appreciate, the terms "equal" or "the same" for the magnetic properties of permanent magnets will have the meaning "as close as possible" or "approximately the same" due to the nature and to the production process of permanent magnets.

The magnets 4, 5 are equally polarised and positioned next to each other in a symmetrical way with their symmetry axes 7 parallel and with the polarisation in the same direction, as can be seen in FIG. 2a. The distance between the magnets is denoted with D. Positioned in this way, the magnets will repulse each other, and more specific the north pole of magnet 4 will repulse the north pole of magnet 5 and the south pole of magnet 4 will repulse the south pole of magnet 5. Because the magnets are fixed in relation to each other, the magnetic force between the magnets cannot move the magnets. Instead, the magnetic field from the magnets will deform symmetrically in respect to a plane in between the magnets, indicated as the centre line 6 in FIG. 2b.

In this example, rectangular magnets are used. The size of the magnets depends on e.g. the desired magnetic field strength. Depending on the desired magnetic field, other geometric shapes are also possible. E.g. bars where one side is much longer than the other sides or circular ring magnets are possible to use. It is important that the magnets are positioned so that they repulse each other, preferably with the north pole and south pole positioned next to each other, side by side. The sides closest to each other are preferably flat.

Figure 3B:
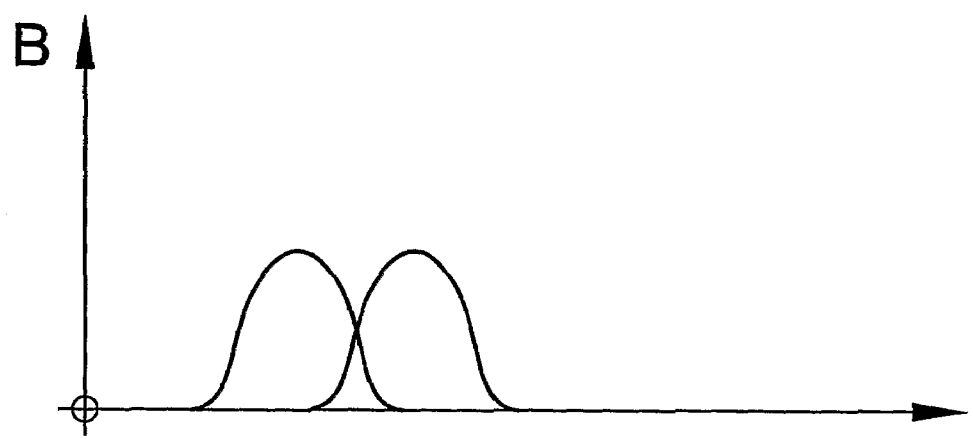
Figure 3C:
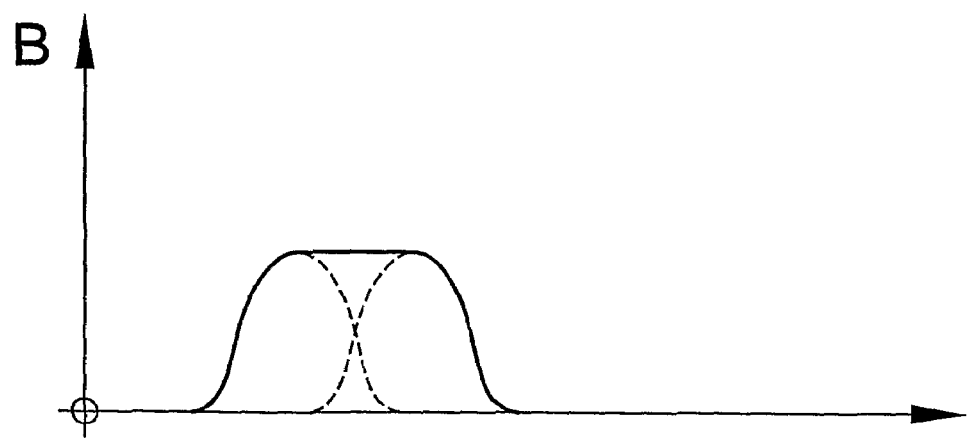

In FIG. 2b, the magnetic field lines are deformed somewhat. When the distance D between the magnets is decreased, the magnets will repulse each other and the outer magnetic field at the north pole and south pole will increase, i.e. the magnetic flux density will increase. A schematic relationship between the magnetic flux density B for a magnet and the distance D is shown in FIG. 3a-3c. FIG. 3a shows the magnetic flux density B for two magnets at a distance when the magnets do not affect each other.

At a certain distance, the magnetic flux density B will superimpose so that the magnetic field will be approximately equal between the symmetry axes 7 of the magnets. At this distance, the magnetic field will be as wide as possible with an equal density. This distance is denoted the critical distance d. If the distance D is decreased further, the magnetic flux density B will continue to superimpose and when the magnets touch, the magnetic field will equal that of a single magnet with the size of the two magnets combined.

FIG. 3b shows the magnetic flux density B for two magnets at the critical distance d where the magnetic field will be approximately equal and as wide as possible. The resulting magnetic field from FIG. 3b can be seen in FIG. 3c.

The critical distance d depends on various magnetic properties of the magnets. The critical distance d is small compared to the magnets. As an example, the critical distance d for two ceramic type magnets with the size 12*6*4 mm can be approximately 0.9 mm. The easiest way to obtain the critical distance d is by empirical measurements.

The appearance of the magnetic flux density along line 6, i.e. how pointed the magnetic flux density is, can be altered somewhat by adjusting the distance D. At the critical distance d, the magnetic flux density is as flat and wide as possible. In some cases, it may be desirable to have a magnetic flux density that is somewhat wider and not as flat. In this case, the distance between the magnets is extended somewhat. A preferred value for the distance between the two magnets is 50% to 150% of the critical distance d. Such a distance gives an acceptable flux density distribution.

FIGS. 7 and 8 show magnetic arrangements with circular ring magnets. In FIG. 7a, one ring magnet is positioned inside the other, preferably the critical distance d apart. FIG. 7b shows schematically the resulting magnetic field in a cut along line 15. In FIG. 8a, the two ring magnets are positioned next to each other, preferably the critical distance d apart. FIG. 8b shows schematically the resulting magnetic field in a cut along line 16.

This well-defined magnetic field can be used in a number of applications, of which a few will be described below. Preferably, the magnetic arrangement is used for various contact-less detectors.

Figure 4A:
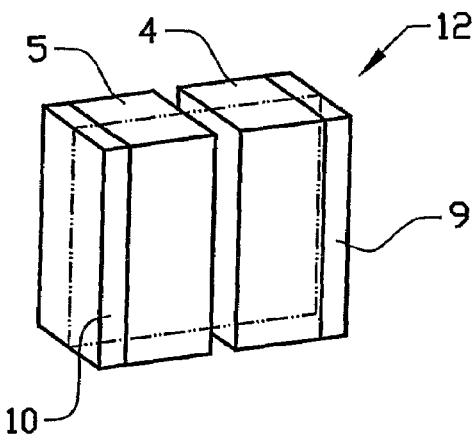
FIG. 4a shows an embodiment of the magnetic arrangement included in the invention.

One way to improve the magnetic arrangement 3 as shown above is to use pole-pieces. FIG. 4a, shows a magnetic arrangement 12 comprising two magnets 4, 5 and two pole-pieces 9, 10. Preferably, the magnets have approximately the same magnetic properties. It is advantageous if the magnets are made out of the same material and have the same geometric outline, but some deviations are acceptable. The resulting effect is a normalisation of the magnetic field.

A pole-piece is made of a ferromagnetic material and is positioned at a side of a magnet. A pole-piece will collect and lead the magnetic field through the pole-piece instead of through the air. This alters the magnetic flux density in that the magnetic field will be concentrated in the pole-piece. Thus, a high magnetic flux density that is embedded in the pole-piece is obtained. The size of a pole-piece corresponds to the magnet at which it is positioned, and the thickness of the pole-piece is configured so that no saturation in the pole-piece occurs.

The pole-pieces 9, 10 are positioned at the outer sides of the magnets, that is pole-piece 9 is in close contact with the right side of magnet 4 and pole-piece 10 is in close contact with the left side of magnet 5, as can be seen in FIG. 4a. The thickness of the pole- pieces is chosen so that no saturation in the pole- piece occurs.

Figure 4B:
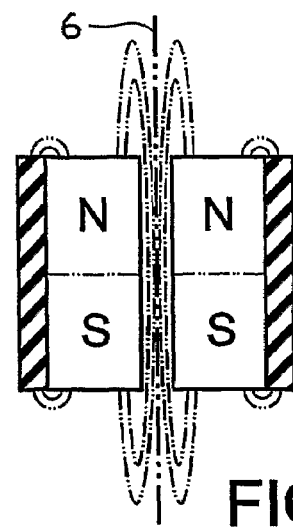
FIG. 4b shows a cut section of the embodiment according to 4a with magnetic field lines.

A schematic view of the resulting arrangement 12 is shown in FIG. 4b. In comparison with the arrangement 3 from FIG. 3b, the magnetic flux density around the outer sides of the arrangement is concentrated closer to the arrangement. In combination with the in space-dispersed magnetic field obtained in between the magnets, this concentration of magnetic flux density at the outsides of the magnets also helps to reduce disturbing influences from the magnetic field of the magnets. Since the magnetic field from the two outer sides of the magnets are embedded in the pole-pieces and also symmetric, the resulting magnetic field is very stable in geometry.

Figure 5A:
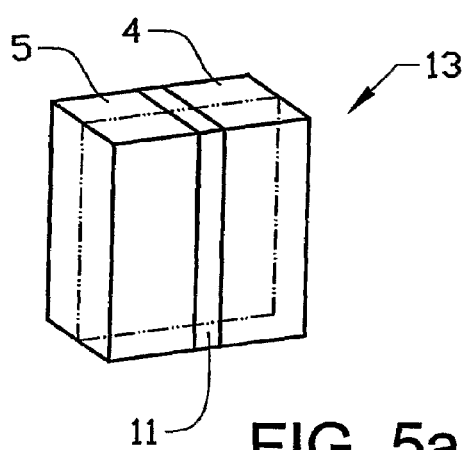
FIG. 5a shows an embodiment of the magnetic arrangement included in the invention.
Figure 5B:
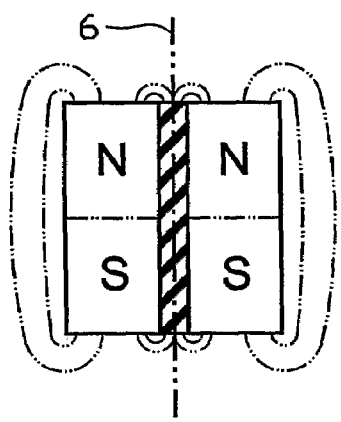
FIG. 5b shows a cut section of the embodiment according to 5a with magnetic field lines.

Another magnetic arrangement 13 is shown in FIG. 5a, where the magnetic arrangement 13 comprises two magnets 4, 5 and a pole-piece 11. Preferably, the magnets have approximately the same magnetic properties. It is advantageous if the magnets are made out of the same material and have the same geometric outline, but some deviations are acceptable.

The pole-piece 11 is laminated between, that is in contact with, the two magnets 4, 5. The thickness of the pole-pieces is chosen so that no saturation in the pole-piece occurs.

The pole-piece 11 will collect and lead the magnetic field through the pole-piece instead of through the air. This alters the magnetic field around the centre line 6 in that the magnetic field will be more concentrated. Thus, a high magnetic flux density that is embedded in the pole-piece is obtained. This type of magnetic arrangement can be used e.g. in combination with a linear displacement sensor comprising a coil where a softmagnetic core is to be saturated. The saturation area of the core influences the coil such that the position of the saturated area, and thus e.g. the position of a piston head in a hydraulic cylinder, can de detected.

Figure 6A:
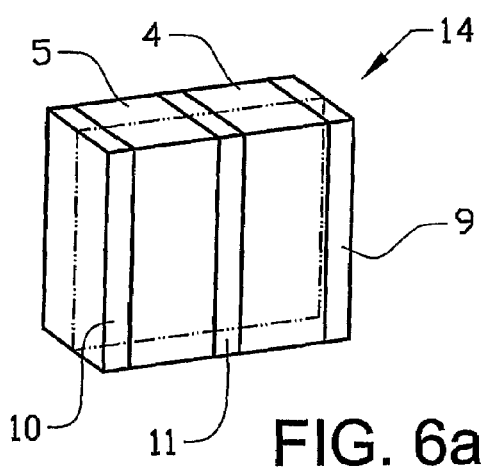
FIG. 6a shows an embodiment of the magnetic arrangement included in the invention.
Figure 6B:
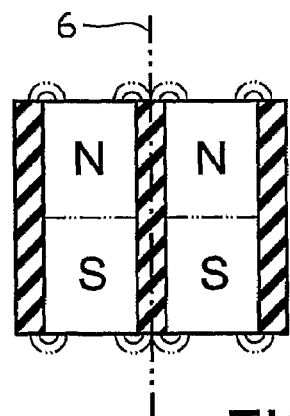
FIG. 6b shows a cut section of the embodiment according to 6a with magnetic field lines.

Another magnetic arrangement 14 is shown in FIG. 6a, where the magnetic arrangement 14 comprises two magnets 4, 5 and three pole-pieces 9, 10 and 11. Preferably, the magnets have approximately the same magnetic properties. It is advantageous if the magnets are made out of the same material and have the same geometric outline, but some deviations are acceptable.

The pole-pieces 9 and 10 are positioned to the outer sides of the magnets, that is pole-piece 9 is in close contact with the right side of magnet 4 and pole-piece 10 is in close contact with the left side of magnet 5. The thickness of the pole-pieces 9, 10 are chosen so that no saturation in the pole-pieces occurs. The pole-piece 11 is laminated between, that is in contact with, the two magnets 4, 5. The thickness of pole-piece 11 is chosen so that no saturation in the pole-piece occurs. With this embodiment, a high magnetic dispersed flux density that is more equally distributed is obtained.

Above, different approaches using a magnetic arrangement for obtaining a well-defined magnetic field are described. These magnetic arrangements are preferably used in magnetic detectors and magnetic switches.

However, in the above magnetic arrangements, it is assumed that the magnetic field of a magnet is symmetrical along its symmetry axis 7, a centre line running from N to S in the middle of the magnet. This is, however, rarely the case for normal production permanent magnets. Instead, the direction of the magnetic field deviates with an angle in respect to the symmetry axis 7. This deviation is normally comparably small, in the region up to 10 degrees, but can be as high as 30 degrees. This deviation in turn affects the function of a magnetic switch or a magnetic sensor where such a magnet is used. The described magnetic arrangements can partly compensate for this deviation.

To improve such a magnetic arrangement further, the deviation of the magnetic field direction can be compensated further. This is done by placing the magnets such that the deviation of one magnet compensates for the deviation of the other magnet. In one example, the magnets have a deviation of 20 degrees. By placing the magnets such that the magnetic field of one magnet deviates with 20 degrees in one direction, e.g. away from the centre line in FIG. 2b, and the magnetic field of the other magnet deviates with 20 degrees in the other direction, here also away from the centre line in FIG. 2b, the resulting magnetic field will be symmetric in respect to the centre line 6, i.e. to the centre of the magnetic arrangement. By placing the magnets so that the deviation of the magnets is in the direction towards the centre line will also create a symmetric magnetic field. The critical distance d may vary slightly depending of the magnetic field deviation of the magnets.

Since it is difficult to detect the deviation of the magnetic field for a single magnet, especially in a production plant, one way of obtaining a symmetric magnetic field is to start with one magnet having the size of the two desired magnets. By dividing the magnet along the centre in a north-south direction and turning one of the resulting magnets 180 degrees around the symmetric axis, the resulting magnetic field from the resulting magnetic arrangement will always be symmetric, regardless of the deviation of the magnetic field in the single starting magnet. The cutting of a magnet is well known to the skilled person and is not described further.

Using the same method, it is also possible to create a magnetic arrangement that resembles a single magnet but where the direction of the magnetic field is always parallel with the symmetry axis. This is done as described above, the difference being that the magnets are positioned together after the splitting, i.e. the critical distance is close to or equal to zero. Regardless of the deviation of the magnetic field in the starting magnet, the resulting magnetic field will always be symmetric.

Figure 9:
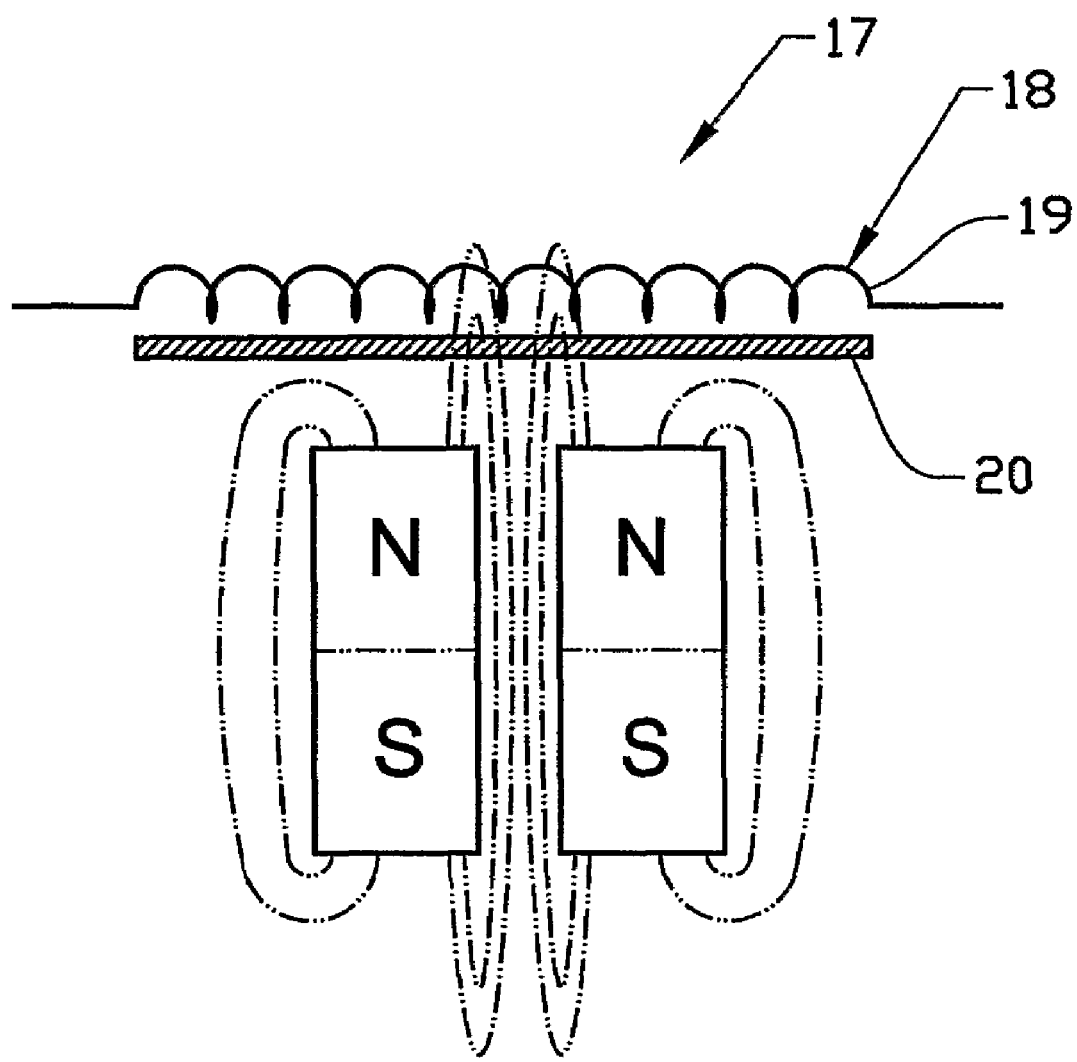
FIG. 9 shows a magnetic sensor according to the invention.

In a first embodiment of an inventive magnetic sensor 17, the sensor comprises two magnets 4, 5 and a magnetically sensitive linear sensor element 18. This linear sensor element can be analogue or with a number of discrete steps. The sensor element preferably comprises a linear coil 19 and at least one softmagnetic core 20 that is to be saturated, but an integrated magnetic detector can also be used. These linear magnetic sensors are well known to the skilled person and are not described further. An example of a magnetic sensor is shown in FIG. 9. In this example, the sensor is integrated in a hydraulic cylinder (not shown) and is used to indicate the position of the piston head. Because of the high pressure in the cylinder, it is advantageous not to have any electrical cables entering or exiting the piston. Thus, a magnetic arrangement as described above comprising two magnets is integrated in the piston head. The magnets have a circular, ring-shaped outline as shown in FIG. 8, with the north pole on the outer side and the south pole on the inner side. The two magnets are positioned side by side, spaced apart with the critical distance d.

On the outside of the hydraulic cylinder, the linear detector is placed. The magnetic field of the magnetic arrangement will influence the core and this influence can be detected by using the coil in a known manner. Because the magnetic field from the magnetic arrangement is well-defined, a high resolution can be obtained. The detector outputs a signal proportional to the position of the piston head, thus the position of the piston head can be detected. The hydraulic cylinder can e.g. be used for a steerable rear axle on a truck to indicate the position of the piston head and thus the steered wheel angle.

The circular magnets are used because the piston head is not fixed in a rotational direction inside the cylinder. In a hydraulic cylinder where the rotation of the piston head is known or fixed, it is also possible to use a magnetic arrangement that does not cover the complete periphery of the piston head.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

In further embodiments of the inventive magnetic detector, different combinations of magnetic arrangements, having e.g. different geometric shapes, and different types of sensor elements can be utilised. The inventive magnetic detector is useful for all types of linear and rotational measurements. The invention is not to be regarded as being limited to the embodiments described above, a number of additional variants and modifications being possible within the scope of the subsequent patent claims. The magnetic arrangement can, for example, also be used for other types of detectors or switches.

What is claimed is:

1. Magnetic detector arrangement, comprising two equally polarised magnets formed by dividing a single magnet in two equal parts along a line parallel to an axis of symmetry of the single magnet, the magnets being positioned next to each other with polarisation of each magnet in the same direction, and a magnetic detector element, wherein the magnets are arranged at a predefined distance apart such that magnetic fields from the magnets will superimpose, the predefined distance is close to zero, the magnets are arranged such that the magnetic field is symmetric in respect to a central line between the magnets, a space between the magnets is filled with a ferro-magnetic material, and the magnets are supplied with a ferro-magnetic material on sides of the magnets opposite the space between the magnets.

2. Magnetic detector arrangement according to claim 1, wherein the predefined distance is a critical distance.

3. Magnetic detector arrangement according to claim 1, wherein the space between the magnets is filled with a non-magnetic material.

4. Magnetic detector arrangement according to claim 1, wherein the magnetic detector element is an analogue magnetically sensitive element.

5. Magnetic detector arrangement according to claim 4, wherein the magnetic detector element is a linear magnetically sensitive element comprising a coil and at least one core.

6. Magnetic detector arrangement, comprising two equally polarised magnets positioned next to each other with polarisation of each magnet in the same direction, and a magnetic detector element, wherein the magnets are arranged at a predefined distance apart such that magnetic fields from the magnets will superimpose, wherein the magnets are supplied with a ferro-magnetic material on sides of the magnets opposite a space between the magnets.

7. Method for obtaining a symmetric magnetic field in a magnetic detector arrangement from a magnetic arrangement comprising two magnets, comprising:

determining whether each magnet displays a deviation of a direction of a magnetic field in respect to a symmetry axis for each magnet, positioning both magnets at a predefined distance such that a space is defined between the magnets and such that the deviation is symmetric in respect to a central line between the magnets, and supplying the magnets with a ferro-magnetic material on sides of the magnets opposite the space between the magnets.

8. Method according to claim 7, wherein the predefined distance is the critical distance.

9. Method for obtaining a symmetric magnetic field in a magnetic detector arrangement from a magnetic arrangement comprising two magnets, comprising:

determining whether each magnet displays a deviation of a direction of a magnetic field in respect to a symmetry axis for each magnet, and positioning both magnets at a predefined distance such that the deviation is symmetric in respect to a central line between the magnets, wherein the two magnets are obtained by parting a single magnet in two equal parts along a line parallel to a symmetry axis of the single magnet and wherein one of the two magnets is rotated 180 degrees around its symmetry axis.

10. Method according to claim 9, wherein the predefined distance is the critical distance.

11. Method according to according to claim 10, wherein the predefined distance is close to zero.

* * * * *